US008494955B2

(12) United States Patent
Quarterman et al.

(10) Patent No.: US 8,494,955 B2
(45) Date of Patent: Jul. 23, 2013

(54) METHOD, SYSTEM, AND SERVICE FOR QUANTIFYING NETWORK RISK TO PRICE INSURANCE PREMIUMS AND BONDS

(76) Inventors: John S. Quarterman, Lancaster, NY (US); Peter F. Cassidy, Cambridge, MA (US); Gretchen K. Phillips, Lancaster, NY (US)

(*) Notice: Subject to any disclaimer, the term of this patent is extended or adjusted under 35 U.S.C. 154(b) by 2571 days.

(21) Appl. No.: 11/087,237

(22) Filed: Mar. 23, 2005

(65) Prior Publication Data
US 2005/0261943 A1    Nov. 24, 2005

Related U.S. Application Data

(60) Provisional application No. 60/555,442, filed on Mar. 23, 2004.

(51) Int. Cl.
G06Q 40/00    (2012.01)
(52) U.S. Cl.
USPC ........ 705/38; 705/1; 705/4; 705/50; 713/164; 726/25
(58) Field of Classification Search
USPC .................................................... 705/35–45
See application file for complete search history.

(56) References Cited

U.S. PATENT DOCUMENTS

| | | | | |
|---|---|---|---|---|
| 2002/0083343 | A1* | 6/2002 | Crosbie et al. | 713/201 |
| 2002/0120558 | A1* | 8/2002 | Reid | 705/38 |
| 2003/0028803 | A1* | 2/2003 | Bunker et al. | 713/201 |
| 2003/0126049 | A1* | 7/2003 | Nagan et al. | 705/35 |
| 2004/0167793 | A1* | 8/2004 | Masuoka et al. | 705/1 |
| 2005/0096944 | A1* | 5/2005 | Ryan | 705/4 |
| 2005/0097320 | A1* | 5/2005 | Golan et al. | 713/166 |
| 2005/0131828 | A1* | 6/2005 | Gearhart | 705/50 |
| 2005/0132225 | A1* | 6/2005 | Gearhart | 713/201 |

OTHER PUBLICATIONS

NPL1:"Operational Risk and New Basel Capital Accord", by Marsh, Putnam and Mercer, The Federal Reserve Bank of Boston, Nov. 15, 2001.*
NPL2: "Justify the Return on Security Investments to Company Stakeholders", Crafting a quantifiable business case, ICCT Corp, Chris Shepherd, Jan. 8 2003.*
NPL3: "Communications of the ACM, A Framework for Using Insurance for Cyber-Risk Management", Gordon, Loeb and Sohail, Mar. 2003.*
Quarterman, John S. and Phillips, Gretchen K. "Perils of Banking on the Internet—Latency, Non-redundancy, and Congestion," InternetPerils, Inc., 2004.

* cited by examiner

Primary Examiner — Alexander Kalinowski
Assistant Examiner — Abhishek Vyas
(74) Attorney, Agent, or Firm — Simpson & Simpson, PLLC

(57) ABSTRACT

The invention broadly comprises a method for determining financial loss related to performance of an internetwork. The method correlates input information regarding performance of an internetwork to operations of a financial entity underwriting insurance premiums and bonds and translates the correlated input information into at least one operational risk for the entity. In some aspects, the internetwork is the Internet. The method gathers secondary external information other than directly from the internetwork, correlates the input and secondary external information, and translates the correlated input and secondary external information into at least one operational risk for the entity. For at least one subset and one peril, the method determines a spread in time and space of effects of the at least one anomaly and peril on the internetwork and on the at least one subset.

23 Claims, 2 Drawing Sheets

METHOD, SYSTEM, AND SERVICE FOR QUANTIFYING NETWORK RISK TO PRICE INSURANCE PREMIUMS AND BONDS

CROSS-REFERENCE TO RELATED APPLICATIONS

This application claims the benefit under 35 U.S.C. §119(e) of U.S. Provisional Application No. 60/555,442, filed Mar. 23, 2004.

FIELD OF THE INVENTION

The invention relates to computer network performance and financial risk management, and more particularly, to a method to determine financial risk related to price insurance premiums and bonds.

BACKGROUND OF THE INVENTION

Commerce continues to embrace the Internet and to become dependent upon it and on related internal enterprise networks. Companies buy and sell and settle payments over the Internet. Companies attract prospects over the Internet and retain customers using the Internet. Companies communicate with customers, suppliers, and employees over the Internet. The more financial services companies, insurers, and other enterprises come to depend on the Internet as critical business infrastructure, the greater the cost of risk to business from perils on the Internet. Consequently, a novel method is needed (and presented here) to quantify Internet risks in order to rationally price financial risk-transfer instruments developed to mitigate business losses resulting from such Internet business risks.

Business operational risks must be quantified and rationalized for a commercial enterprise to safeguard its interest in maintaining its continuity of service for its customers and for its own success in the face of perils, including those that may be considered perhaps unacceptable hazards, and of anomalies. From this principle, insurance and surety and performance bonds have become routine risk transfer instruments for most commercial enterprises, covering business liabilities and fortuitous risks. Those instruments are based on actuarial tables and actuarial matrices informed by decades and sometimes centuries of event data and cost estimates, and for the restoration of losses (in the case of Surety and Performance bonds). Insurance companies characterize a covered party to categorize it within a cohort (a group of parties with similar risks), and then they calculate the realized risks based on that cohort's experience over time, and the costs of restoring the losses consequential to adverse events that will possibly visit a member of a described cohort. This process allows the insurance companies to discover a rational price for a policy premium. Bond issuers, likewise, assess the risks to an enterprise based on actuarial data (for performance bonds) and the underwritten company's financial data (for debt instruments) to rate its risks and thereby arrive at a market price and, subsequently a yield that will attract a market for a bond issue.

For a commercial enterprise to manage computer network risk with the same level of rationality it would apply to conventional business risk, risks related to the network (such as the Internet or an enterprise-managed internetwork) would have to be quantified in correlation to the infrastructure that the commercial enterprise engages when it joins a specific logical network topology (such as when it interoperates with the Internet or any other internetwork). Further, the characterization of that topology and quantification of its performance and that topology's inherent risks must be kept current since risks on the Internet are contemporaneous to conditions, which can change from moment to moment. Enterprise use of the Internet is susceptible to the same congestion, misconfigurations, accidents, natural disasters, terrorism, and vandalism that can affect anything else on the Internet. Outsourcing, for example of Information Technology (IT) tasks, call center, accounting, etc., requires additional network connectivity because frequently the staff to whom tasks are outsourced are not on site, but rather in a distant state or even country. Thus outsourcing introduces counterparty risk including not only the outsourced unit, but also the intervening components of the Internet (Internet Service Providers, exchanges, routers, and links) and the various governmental jurisdictions through which those components pass.

Internet risks include both those targeted at a specific enterprise, and those that are not targeted. Targeted risks include denial of service (DoS) attacks, unauthorized intrusion, theft of data and services, and terrorist attacks. Untargeted disasters may nonetheless be risks to enterprises. Such untargeted risks include equipment failure, power outages, cable cuts, congestion, routing misconfiguration, hurricanes, floods, and other natural disasters. Worms and viruses may be either targeted or untargeted. Untargeted Internet disasters are also known as cyberhurricanes.

Targeted risks may be somewhat ameliorated by intrusion detection and intrusion prevention. But untargeted risks can have effects outside the enterprise that are beyond the reach of intrusion detection and prevention. For both kinds, but especially for untargeted risks, insurance is an answer.

To date, however, the insurance industry and commercial finance houses have had no systematic regimen to recruit Internet performance event data and distill them into usable actuarial tables or actuarial matrices of any kind for Internet perils or Internet performance or Internet connectivity anomalies. The Internet performance insurance policies that have been developed over the past 10 years are considered to be market priced. This leaves uncertainty about the rationality of the premium prices that are charged for them. Those policies are typically named peril policies with detailed lists of exclusions and what are believed to be substantially up-priced premiums. Reinsurance companies have resisted entering the so-called Internet risk insurance market, given the uncertainty of the risks and the serious doubts surrounding the rationality of the prices on their premiums. That absence of wholesale market participation, meanwhile, is severely limiting the retail insurance carriers' ability to grow their markets for Internet risk insurance policies. At the same time, catastrophe bonds (or catastrophe-indexed notes or catastrophe-linked securities) have gained footholds in markets to hedge weather risk and re-insurer life insurance risk. Such bonds would be ideal risk-transfer instruments for Internet risk, and could supplement reinsurance carriers' participation. Yet Internet catastrophe bonds are stymied for lack of performance data or event data that could inform their underwriting regimens. Without regimens of the kind that are used to construct actuarial tables and matrices, the product lines for Internet risk policies will continue to be severely impeded and underwriters of Internet risk bonds will not have the actuarial tools required for issuing relevant hedge instruments.

New phenomena require new actuarial tables and new formulae for calculation of risk based on real event data. None currently exist for Internet risk.

Thus there is a long-felt need for a method, system, and ongoing service for quantifying Internet operational risk and for formulaic interpretation of those risks into probability models which insurers and bond underwriters can use in underwriting risk-transfer instruments such as insurance policies and bonds.

SUMMARY OF THE INVENTION

The invention broadly comprises a method for determining financial loss related to performance of an internetwork. The method correlates input information regarding performance of an internetwork to operations of a financial entity and translates the correlated input information into a first at least one operational risk for the financial entity. The financial entity underwrites insurance premiums and bonds. In some aspects, the internetwork is the Internet. In some aspects, the method gathers secondary external information, where the secondary external information is other than directly from the internetwork, correlates the input and secondary external information, and translating the correlated input and secondary external information into a second at least one operational risk for the financial entity.

In some aspects, the method includes at least one subset and at least one peril. Then, the method determines a spread in time and space of effects of the at least one anomaly and the at least one peril on the internetwork and on the at least one subset. In some aspects the internetwork comprises a plurality of known anomalies and the method further collates the plurality of known anomalies according to type. For each type, the method computing a probability of occurrence, duration, and effects. In some aspects, the internetwork comprises a subset of nodes and the method estimates probabilities of degradation or interruption of connectivity to the subset of nodes.

One object of the present invention is to quantify the existence, probability, and effects of network weak points (perils) and cases of unusual operations (anomalies) as risks to businesses.

Another object of the present invention is to translate quantified operational risk into terms that insurance entities can use in pricing and underwriting insurance policies and bonds and issue yields.

These and other objects, features and advantages of the present invention will become readily apparent to those having ordinary skill in the art upon a reading of the following detailed description of the invention in view of the drawings and claims.

BRIEF DESCRIPTION OF THE DRAWINGS

The nature and mode of operation of the present invention will now be more fully described in the following detailed description of the invention taken with the accompanying drawing Figures in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
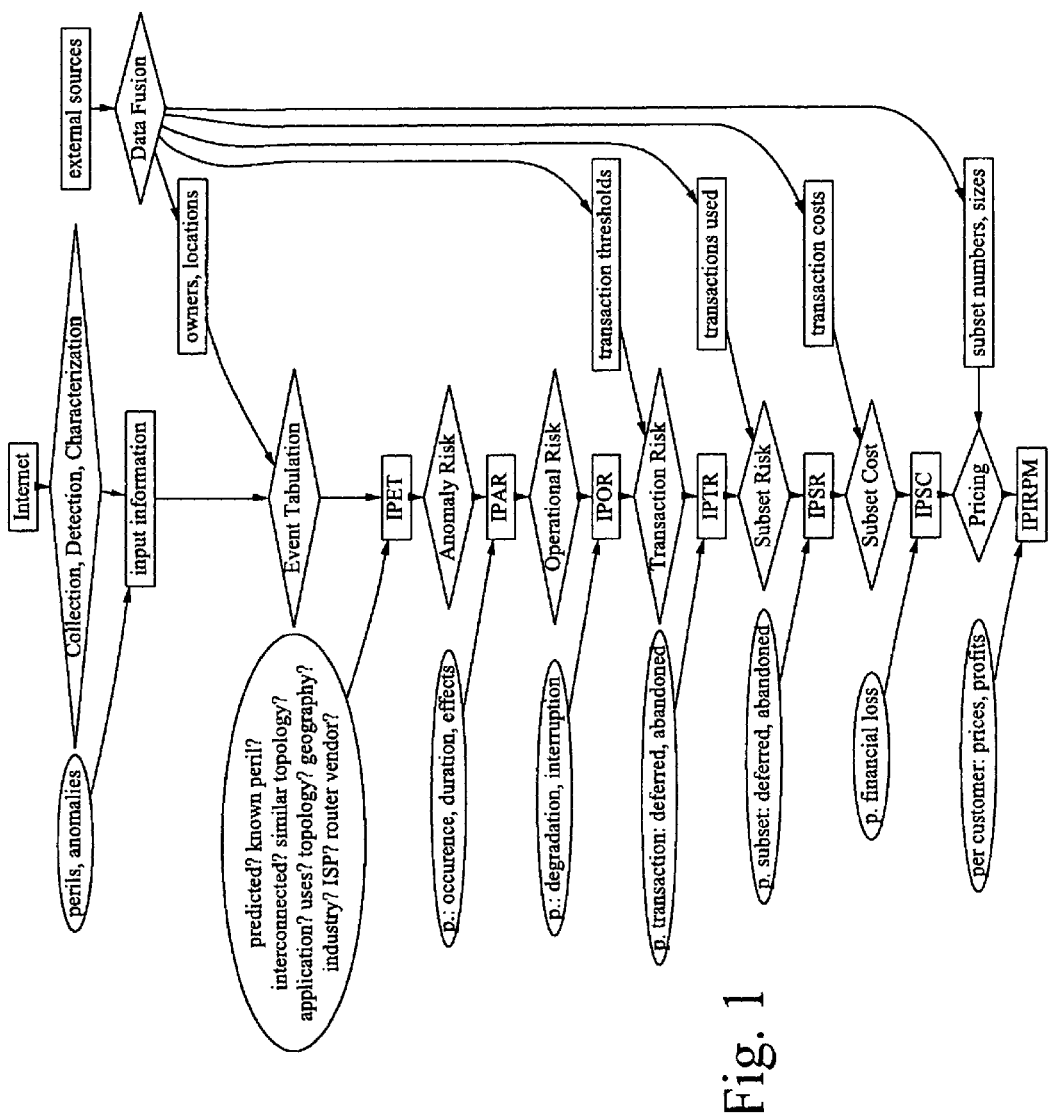
FIG. 1 illustrates the steps or aspects of the present invention insurance pricing service; and, FIG. 2 depicts an example of an Internet financial risk, a nonredundant route.

FIG. 1 illustrates the steps or aspects of the present invention insurance pricing service. The invention uses data from ongoing comprehensive measurement of Internet topology that identifies nonredundancy or overload (perils: hazards or dangers), as well as actual variations in accessibility or performance (anomalies: loss, harm, or injury). The invention itself analyses, aggregates, and synthesizes such data along with information from other sources in order to translate it into relevant insurance terms. In comparison to known prior art, the invention combines elements of network performance and of financial quantification in application to risk management of Internet operations. The invention consists of the following steps or aspects, which are not necessarily sequentially dependent and that can be performed once for a report based on static data or continually repeated with feedback loops that will provide updated risk assessments reflecting contemporary conditions on the internetwork topology being interrogated for internetwork performance risk. Notes on the preferred embodiment are also included.

Figure 2:
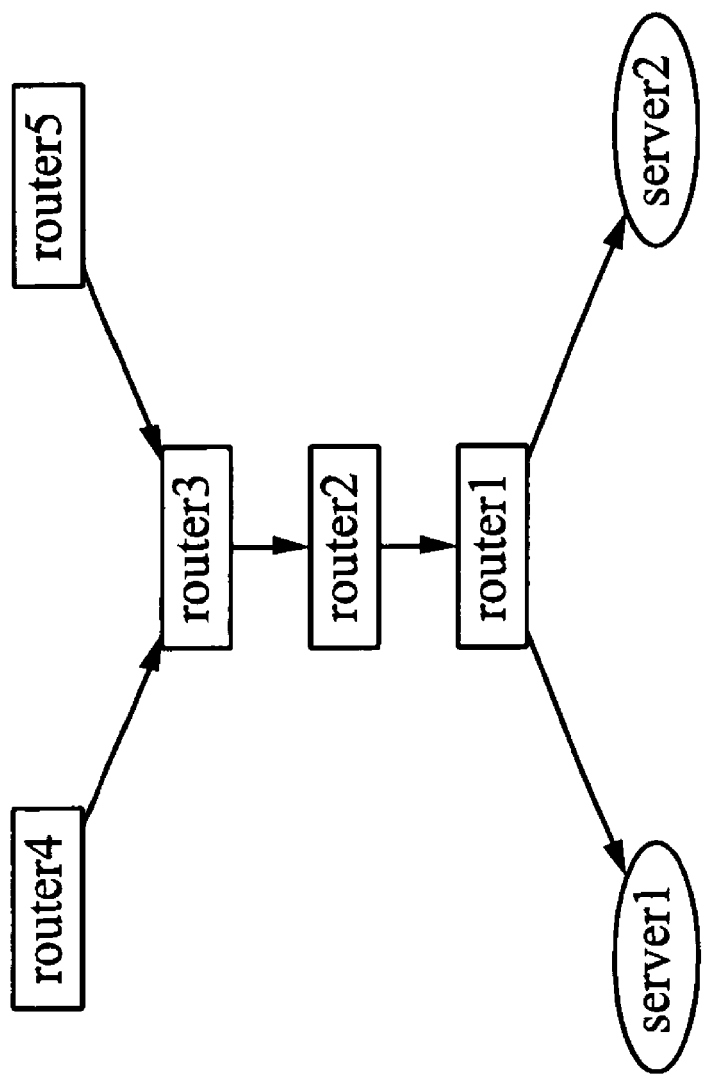

FIG. 2 depicts an example peril, a nonredundant route. A given part of the Internet may be reachable only through one path. If a router or link along that path fails, that part of the Internet will be cut off. In the figure, router1, router2, and router3 are nonredundant routers on a nonredundant route to server1 and server2. If any of router1, router2, or router3 fail, server1 and server2 will be cut off from the Internet. If router4 or router5 fails, there is less likelihood that server1 or server2 will be cut off, because if router4 fails traffic could be routed through the router5, and the reverse. Even if a link or path does not completely fail, its performance may be degraded. Problems with performance of a server may produce contributory disruption to third parties with which that server shares network pathways. In FIG. 2, if server1 is being attacked by a distributed denial of service (DDoS) or being affected by a worm that is not specifically targeted at that server, the resulting excess traffic may slow down router1, which in turn can affect the perceived performance of server2 as seen by its users.

The invention uses information collected directly from the Internet or other TCP/IP networks, also known as input information or primary input information that is collected and processed by any means known in the art to detect and categorize certain features. It should be understood that the invention is not limited to any particular means for producing such information about the Internet. However, the invention expects the input information to have characteristics as follows; see FIG. 1. The input information is collected and processed by means outside the invention to detect and categorize certain features such as those described below in this section under the topics of data collection, anomaly detection, and anomaly characterization.

Network Data Collection:

Appropriate network data collection gathers Internet performance data using techniques that simultaneously record topology (including TCP/IP packet routes, TCP/IP packet paths, and changes in them over time) and performance (including TCP/IP packet loss and latency). The techniques used are able to measure a significant proportion of the critical infrastructure of the entire Internet, such as routers with many connections or that connect many topological or geographical regions or large numbers of servers or users.

Network Anomaly Detection:

Appropriate anomaly detection is able to detect anomalies that are significant both across large parts of the Internet and in smaller subsets, for example geographical, topological, or by industry.

Network Anomaly Characterization:

Appropriate anomaly characterization assigns characteristics such as type, severity, duration, and effects to each detected anomaly. Types of anomaly may include denial of service (DoS) attacks, worms, congestion, routing flaps, and other degradation, denial, or disconnection of Internet connectivity. The invention also uses secondary external information, that is information that i.e. external to the Internet in the sense of not being collected directly from the Internet by probes or passive monitoring. FIG. 1 illustrates how the invention combines such external information with the input information in data fusion. Successive steps of the invention may be able to use increasing amounts of secondary external information in comparison to primary input information, yet all the steps can be performed without secondary external information.

The invention involves several steps or aspects that are not necessarily sequentially dependent and that can be performed once for a report based on static data or continually repeated with feedback loops that will provide updated risk assessments reflecting contemporary conditions on the internetwork topology being interrogated for internetwork performance risk.

The present invention includes the steps or aspects illustrated in FIG. 1 and described below:

1. Event Tabulation.

The invention estimates the spread in time and space of effects of perils and anomalies on the entire Internet and subsets of it. Such effects may include performance degradation and changes in connectivity, including disconnection of nodes or segments of the Internet. Appropriate subsets may include specific industries, geographical regions, Internet Service Providers (ISPs), or specific application servers, such as web servers, domain name servers, or database servers. The invention records the occurrence and effects of perils and anomalies in tables.

2. Data Fusion.

The invention uses historical and contemporary data from external sources such as carriers, enterprises, news media, financial institutions, or industry analysts, fusing (integrating) such data with network data as corroborating evidence of the existence, type, and other characteristics of a peril or anomaly, to calibrate accuracy of results, and to determine other information relevant to network business risk (see FIG. 1).

3. Anomaly Risk.

The invention collates known anomalies according to type. For each type, it takes the number of anomalies and divides it by the length of time in which they all occurred to determine probabilities of occurrence, duration, and effects.

4. Operational Risk.

The invention estimates probabilities of degradation or interruption of connectivity to subsets of nodes by server type, use, topology, geography, industry, software, vendor, or other criteria.

5. Transaction Risk.

The invention fuses external information about user reactions to determine probable business costs of performance effects.

6. Subset Risk.

The invention uses external information about each subset to determine which transactions are used by that subset, and how much that subset uses them, and uses that additional information to compute independent transaction risk per subset.

7. Subset Cost.

The invention fuses further external information about each subset such as income and customer retention to estimate a plausible cost to the subset for each loss.

8. Insurance Policy Premium Pricing.

The invention integrates (fuses) external information about the number of enterprises in an industry to estimate probable total cost per industry, in order to determine how much claims on insurance policies for various types of anomalies could cost. It then estimates for different numbers of insurance customers within that industry how many at what price insurance can be sold in order to cover claims and to make various levels of profit to the selling insurer. It also estimates prices for insurance bonds derived from global risks of internetwork performance perils across the public TCP/IP-based global network known as the Internet that could precipitate extensive internetwork performance degradation, especially affecting valuable transactions.

9. Insurance Policy Examination.

The invention provides an underwriting process to assess total risk of internetwork performance anomalies occurring along a defined network topology for the purposes of determining appropriate insurance policies and premium prices.

10. Insurance Claims Adjustment.

The invention provides a regimen to interrogate the covered network topologies to make estimates of internetwork conditions at the time of a loss and to calibrate the disbursement against the covered party's claims.

11. Updates.

Ongoing updates of actuarial tables to keep them in correspondence with the current state of the Internet.

12. Forecasting.

The various probabilities may also be used in predictions or forecasts. Each probability of occurrence may be used to predict future occurrences. Each probability of duration may be used to predict the progress of a current anomaly of the corresponding type.

13. Visualization. The invention provides for systems that visualize performance characteristics and related quantified perils, anomalies, losses, and risk probabilities in charts, graphs, maps, and moving pictures. Such visualization may be useful in insurance sales, examination, and adjustment.

In comparison to known prior art, the invention combines elements of network performance and of financial quantification in application to risk management of Internet operations.

The invention uses as data primary input information from ongoing comprehensive measurement of Internet topology that identifies nonredundancy or overload (perils), as well as actual variations in accessibility or performance (anomalies). The invention itself analyses, aggregates, and synthesizes such data along with information from secondary external sources in order to translate it into relevant insurance terms. In comparison to known prior art, the invention combines elements of network performance and of financial quantification in application to risk management of Internet operations. The invention consists of the following steps or aspects, which are not necessarily sequentially dependent and that can be performed once for a report based on static data or continually repeated with feedback loops that will provide updated risk assessments reflecting contemporary conditions on the internetwork topology being interrogated for internetwork performance risk. See FIG. 1 for an illustration of the relation of primary and secondary data to each of the steps. Notes on the preferred embodiment are also included below.

Event Tabulation:

The invention estimates the spread in time and space of occurrence and effects of perils and anomalies on the entire Internet and subsets of it, and expresses those results in the Internetworking Peril Event Tables (IPET). The IPET consists of statistically formulated event tables that are designed to record the distribution of perils and anomalies in time and on discrete topologies within the public TCP/IP-based global network known as the Internet and in private TCP/IP-based networks.

Some perils can produce anomalies that are predictable from the peril itself. For example, a nonredundant route will disconnect certain specific nodes if a nonredundant node along it fails. The failure of such a nonredundant node is an anomaly that has the effect of disconnection on the disconnected nodes. Other anomalies are more subtle. If a nonredundant node does not fail, rather is merely overloaded, the nodes reachable only through it will not be disconnected, but they probably will experience performance degradation. The probable amount of degradation may best be inferred from examining known cases of that type.

Other anomalies may be less closely related to a specific peril related to specific affected nodes. When a worm strikes, Internet Service Provider (ISP) routers are usually not directly infected by the worm, yet they may be affected by congestion resulting from traffic generated by the worm, or by traffic redirected due to failures caused by the worm.

Effects of a given type of worm may cluster in relation to a particular type of server. Web servers supplying world news may be more subject to politically motivated attacks, and ISP routers carrying traffic to them may therefore be more likely to be affected by the resulting congestion, plus enterprise servers on the same ISPs may be similarly affected.

Effects may cluster geographically. There is less bandwidth across the Pacific than there is within North America or within East Asia, so the effects of worms and distributed denial of service (DDoS) attacks are somewhat constrained geographically. Time zones may also affect exploits that thrive on human intervention; a worm that attacks notebook computers at night may appear at work the next day from inside the firewall when people carry notebooks in or dial in.

Effects may cluster by industries. Many e-commerce servers use relational database (RDB) servers, and many of them use the same RDB software. An exploit that affects that monoculture software is likely to affect many of the e-commerce servers that use it.

Effects may cluster by ISP. ISPs tend to standardize on a single router vendor's hardware, so several ISPs using the same vendor's hardware may show similar effects of an anomaly.

For all these cases of clustering of effects, the first step in organizing a cohort within an Internetworking Peril Event Table is to detect them by observing which nodes have similar effects. Such clusters of effects define subsets of the Internet.

The next step is to see what other similarities exist among the affected nodes, by examining questions such as these:

Were they predicted from a previously known peril? Each type of peril represents a hazard of certain types of anomalies; the previous frequency of such anomalies implies a probability of recurrence; if this anomaly occurs when it should have according to a given peril's anomaly frequency tables, the anomaly can be said to be predicted by the peril.

Are they related to a known peril? An anomaly can be said to be related to a known peril if the peril is a hazard for that type of anomaly (for example, nonredundancy is a hazard for disconnection), even if the anomaly did not occur when it should have according to the anomaly frequencies for that peril.

Are they interconnected? Nodes affected by one type of anomaly may also be related by being interconnected closely.

Do they have similar topology? Nodes that are not closely interconnected may have similar interconnection topologies, for example, two nodes may each have many neighbors on their local ISP Point of Presence (PoP). Are they connected to similar application servers? Application servers of the same type, especially if they are running the same software, can serve as attractive targets of miscreants, and such attacks can overflow, for example by increased traffic causing congestion, onto nearby nodes.

Do they have similar uses of an application server? Multiple nodes depending in the same way on the same application server can all be at risk if something happens to the server. Are they nearby geographically? Geography can imply similar risks, such as earthquake, power outage, snowstorm, political instability, or similar remote bottlenecks (such as transoceanic links) even if the nodes' local connectivity is different.

Are they related to the same industry? Enterprises in the same industry often provision and administer their network connections in similar ways, making them susceptible to similar risks.

Are they related to the same ISP? An ISP can misconfigure its routers all at once, go bankrupt, choose to cease service, raise prices abruptly, etc.

Are they related to ISPs that use the same router vendor? This could result in those ISPs all deploying upgrades to their router hardware or software at the same time.

For each anomaly, its IPET shows the answers to the above questions. For each peril, its IPET shows which anomalies were observed to result from it. There are IPET tables for the global Internet as a whole and tables or subsets defined by clustering of effects.

Preferred Embodiment of IPET.

To determine the spread in time and space of effects of perils and anomalies on the entire Internet and subsets of it, a number of different techniques may be used. Preferred techniques for the purpose of this invention include, but are not limited to:

Variance from baselines, either by absolute thresholds, or by a multiple of standard deviation.

Training Hidden Markov Models (HMM).

Multivariate analysis that is, examining several performance metrics simultaneously, such as latency, loss, and reachability, for relative change among them over time.

Cluster analysis.

Data Fusion.

In addition to the primary input information, the invention uses historical and contemporary data from secondary external sources such as carriers, enterprises, and news media as corroborating evidence of the existence, type, and other characteristics of a peril or anomaly, to calibrate accuracy of results, and to determine other information relevant to network business risk. Appropriate data for data fusion may come from a variety of sources that may include but are not limited to domain registrations, autonomous system registrations, telecommunications carrier records and reports, public building records and civil engineering records, government records, military and military intelligence records and reports, third-party internetwork performance report logs, Internet server node operating systems and applications software specifications and reports, software developer and vendor performance specifications and fault logs, hardware developer and vendor performance specifications and fault logs, news media reports, meteorological records, geological records, flood plain records, customer usage and value lists from banks, financial institutions, industry analysts, or other sources, and economic reports about enterprises, industries, or economies. Such data may be about conditions or phenomena that can affect internetworking performance or that can affect parties that are involved in internetworking. Examples may include but are not limited to ownership of nodes and links, economic performance and history of owners, time in service of nodes and links, mean time between failures, mean times between events involving performance degradation below 50% or other threshold of its optimal service levels, degree of variation in the number of contemporaneously functioning pathways, quality and character and performance history of physical media carrying the TCP/IP packet flows described, quality and performance history of the electrical utilities and grids supplying relevant targeted nodes with electricity, geologic stability of the catchment areas in which the relevant nodes reside, tidal properties of the affected areas (basement flooding can be relevant), the building-code compliance history of the edifices in which the targeted nodes are physically housed, transaction thresholds, transactions used, and transaction values to customers and vendors.

Some of this information can be gleaned directly from topology and performance data in the primary input information, yet data fusion using secondary external information enables greater accuracy and reliability and provides additional information. Data fusion is used in epidemiology and in the following steps.

Preferred Embodiment of Data Fusion. For example, when a sudden change of paths within an ISP is detected, especially if the change occurs on the hour, it is useful to check announcements by that ISP of scheduled maintenance windows to determine whether such maintenance is the cause of the anomaly.

Even though ISPs are slow to announce the occurrence or effects of major anomalies such as bad routing announcements or DDoS attacks, usually they eventually do announce them, or report them to the FCC, so historical announcements of that type can be used to calibrate historical data so that signatures of such outages can be tuned and anomalies of those types can be reliably detected and characterized. News media and industry analysts often report major ISP outages and effects faster than the affected ISPs do, and such outside reports may incorporate inside information that came from the ISP by unofficial channels. Such outside reports can be used as speedy accuracy checks for breaking anomalies. ISPs are often forthcoming about minor node or link outages, so it is worthwhile to track all major and many minor ISPs' own anomaly announcements for calibrating anomaly detection.

Anomaly Risk.

The invention collates known anomalies from the IPET according to type. For each type, it takes the number of anomalies and interprets it by the length of time in which they all occurred to determine a probability of occurrence. It computes probable duration of each type of event using statistics such as the minimum, mean, median, and maximum of duration of all the detected anomalies of that type. For some types of anomaly, probable duration may also be a function of the presence of a related peril. Probable effects of each type of anomaly are computed similarly from observed effects, usually with minimal data fusion from secondary external sources. This result is the Internetworking Peril Anomaly Risk (IPAR). The IPAR is expressed as a function or table, the Internetworking Peril Anomaly Risk Matrix (IPARM), for each type of anomaly, showing the probable frequency of occurrence of anomalies of different degrees, along with duration and probable effects.

Operational Risk.

The invention uses the IPAR for each type of anomaly to estimate probability of degradation or interruption of connectivity to subsets by server type, use, topology, geography, industry, software, vendor, or other criteria. These estimates normally use little or no secondary external information. This result is the Internetworking Peril Operational Risk (IPOR). The IPOR is expressed as a table, the Internetworking Peril Anomaly Risk Matrix (IPORM), for each type of anomaly, showing for each subset the probability of degradation of service of increasingly severe levels up to loss of service of increasing lengths of time.

Transaction Risk. To the IPOR, the invention adds information about user reactions to determine probable transaction risks of such performance effects. For example, a user of the TCP/IP-mediated communications space known as the World Wide Web will typically abandon an attempt to look at a web page after a certain delay (currently approximately 8 seconds), so an outage that lasts longer than that will often cause abandonment of business transactions through the web. By combining such secondary external information (or estimates of it) the invention assigns probable costs such as lost and deferred transactions for each type of anomaly.

Beyond such generic user information, the invention adds more specific secondary external information per transaction type, or estimates of such information. For example, automated just in time (JIT) business-to-business transactions will probably be less subject to loss than human interaction with web servers, because the automated transactions will probably retry until they go through. However, there may be a limit on how long a JIT transfer can be delayed and still be in time, so while the threshold for loss due to delay for JIT may be higher than for human web use, it may cause severe losses when reached. Other uses of the Internet, such as wire transfers, stock trades, and real time inventory will each have their own parameters of loss. This result is the Internetworking Peril Transaction Risk (IPTR). The IPTR is expressed as a function or table for each transaction, the Internet networking Peril Transaction Risk Matrix (IPTRM), showing the probable frequency of loss of transaction due to occurrence of different degrees of each type of anomaly.

Subset Risk.

Having established the IPTR, the invention then uses information about each subset to determine, which transactions are transacted involving that subset, and how much that subset uses them. The invention uses that additional information to compute transaction risk per subset. Some such information may be derived relatively directly from the type of nodes in the subset. For example, a subset consisting of domain name servers will usually handle domain name service transactions. A subset consisting of news media web servers will usually handle mostly web transactions, although such servers may also have associated online stores or other services. A subset consisting of B2C e-commerce servers will usually handle many payment transactions, although such a server may also have numerous other services associated with it. Further secondary external information about each specific subset will help in most cases. The invention uses the mix of transactions used by a subset to help determine its parameters of loss, by multiplying rows from the IPTR per transaction by the degree of use of each transaction. It thus summarizes risks of degradation of loss of transactions per subset as the Internetworking Peril Subset Risk (IPSR). The IPSR is expressed as a function or table for each subset, the Internetworking Peril Subset Risk Matrix (IPSRM), showing the probable frequency of loss of each type of transaction due to occurrence of different degrees of each type of anomaly.

Subset Cost.

Once the IPSR is computed, the invention fuses further secondary external information (or estimates thereof) such as income and customer retention for each subset to estimate a plausible cost to the subset for each loss. For an industry subset, such additional usage information may come from sources inside or outside that industry, including from insurance companies. The IPSR for that industry tells us the probable frequency of loss of transactions due to anomalies of different degrees. Costing involves the additional factors of income and customer retention. How much income does the industry derive per day from each customer and from the transactions the customers use? How much of that is over specific network links or paths? In which time zones does an enterprise's trading partners reside, and what are the posted times in which trading days begin and end as prescribed by regulation or industrial conventions? How likely is a customer to be lost due to losses of its transactions, that is, how likely is the customer to take its business elsewhere? For example, if a web page is required to build a shopping cart, and there is sufficient delay in retrieving that web page, the shopper may abandon not only the specific transaction, but also shopping with that business.

Factoring income onto the IPSR, the invention derives probable loss of income to the business for anomalies of various degrees, such as loss of income for a day's outage. Also taking customer retention into account, the invention estimates probabilities of loss of business due to losing customers because of different degrees of anomalies. The result is the Internetworking Peril Subset Cost (IPSC). The IPSC is expressed as a table for each subset, Internetworking Peril Subset Cost Matrix (IPSCM), showing the probable frequency of financial loss due to occurrence of different degrees of each type of anomaly.

Insurance Policy Premium Pricing.

Having established the IPSC, the invention then fuses secondary external information (or estimates thereof) about the number of enterprises in an industry to estimate probable total cost per industry, in order to determine how much claims on insurance policies for various types of anomalies could cost. It then estimates for different numbers of insurance customers within that industry how many at what price insurance can be sold in order to cover claims and to make various levels of profit to the selling insurer. This is the Internetworking Peril Internet Risk Pricing Model (IPIRPM). The IPIRPM is expressed as a function or table for each subset, showing for different numbers of potential insurance customers within that subset, different insurance prices, and the resulting profit margins. The IPIRPM derives prices from spatial and temporal topological performance data, building upon the previous steps of event tabulation, data fusion, anomaly risk, operational risk, transaction risk, subset risk, and subset cost, using data fusion as needed at each step. The IPIRPM also includes prices for insurance bonds related to global risks of internetwork performance perils across the public TCP/IP-based global network known as the Internet that could precipitate extensive internetwork performance degradation, especially affecting valuable transactions.

Insurance Policy Examination.

Just as a sprinkler system affects the price of fire insurance, assessment of an enterprise's Internet connectivity for perils and current anomalies is appropriate to determine appropriate insurance policies and prices. The IPIRPM is built from examination of specific perils and anomalies. Similar examination can be applied to a particular enterprise to assist in selecting a policy and price.

Insurance Claims Adjustment.

The invention provides a regimen to interrogate the covered network topologies to make estimates of internetwork conditions at the time of a loss and to calibrate the disbursement against the covered party's claims. When an enterprise files a claim against insurance that was produced using the IPIRPM, the same examination techniques can be used to help determine whether there actually was an anomaly that produced effects to the enterprise that are covered by the insurance policy.

Updates.

ISPs change configurations; new industries join the Internet; new perils and anomalies occur. After an insurance company uses the IPIRPM to produce actuarial tables for a given insurance policy or bond, those tables need continual updates to keep them in correspondence with the current state of the Internet. The techniques used to produce the IPIRPM or IBIBPM for the first tables can be used repeatedly to produce updates.

Forecasting.

The various probabilities (IPAR, IPOR, IPTR, IPSR, and IPSC) may also be used in predictions or forecasting. Each probability of occurrence may be used to predict future occurrences. Each probability of duration may be used to predict the progress of a current anomaly of the corresponding type.

Visualization.

The invention provides for systems that visualize performance characteristics and related quantified perils, anomalies, losses, and risk probabilities in charts, graphs, maps, and moving pictures. Such visualization may be useful in insurance sales, examination, and adjustment.

Computer System.

The invention can be implemented "by hand," that is, through the use of manual calculations. However, in some aspects, a general purpose computer is programmed to perform the steps described above.

We claim:

1. A method for determining financial loss related to performance of an internetwork, comprising:
   collecting input information regarding performance of an internetwork using techniques that simultaneously record topology and performance;
   detecting at least one anomaly in at least one portion of said internetwork;
   translating said at least one anomaly into at least one operational risk for a financial entity that underwrites insurance premiums and bonds by:
      adding information about a first plurality of enterprises in an industry;

estimating a total cost for said industry for said plurality of anomalies; and, determining respective costs for claims on insurance policies for said industry based on said total cost; or, interrogating at least a portion of the network topology; making estimates of internetwork conditions at the time of an anomaly resulting in a loss; and, calibrating a disbursement against a covered party's claims with respect to the at least one anomaly.

2. The method recited in claim 1 wherein said internetwork is the Internet.

3. The method recited in claim 1 further comprising:
characterizing said at least one anomaly by type, severity, duration, and effect, wherein said at least one anomaly is selected from the group consisting of denial of service (DoS) attacks, worms, congestion, routing flaps, and other degradation, denial, or disconnection of Internet connectivity.

4. The method recited in claim 1 wherein said internetwork comprises at least one subset and at least one peril; and,
said method further comprising: determining a spread in time and space of effects of said at least one anomaly and said at least one peril on the internetwork and on the at least one subset.

5. The method recited in claim 1 wherein said internetwork comprises a plurality of known anomalies; and,
said method further comprising: collating said plurality of known anomalies according to type;
and, and for each said type, computing a probability of occurrence, duration, and effects.

6. The method recited in claim 1 wherein said internetwork comprises a subset of nodes; and,
said method further comprising: estimating probabilities of degradation or interruption of connectivity to said subset of nodes.

7. The method recited in claim 1 wherein said internetwork comprises a subset using a transaction a number of times; and,
said method further comprising: adding information regarding said transaction to compute transaction risk for said subset using a transaction a number of times.

8. The method recited in claim 1 wherein said internetwork comprises a subset; and, said method further comprising: estimating a cost to said subset for said at least one operational risk.

9. The method recited in claim 1 wherein said internetwork comprises a plurality of anomalies.

10. The method recited in claim 1 further comprising:
for an enterprise in an industry, estimating a number of policies to sell and a price at which to sell said number of policies to cover claims associated with said enterprise and provide a level of profit for said financial entity; and,
estimating pricing information of insurance bonds related to performance of said internetwork.

11. The method recited in claim 1 further comprising:
gathering secondary external information, where said secondary external information is other than directly from said internetwork;
correlating said input and secondary external information; and,
translating said correlated input and secondary external information into a second at least one operational risk for said financial entity.

12. The method recited in claim 1 further comprising:
examining an internetwork connection for a prospective customer of said financial entity to identify a customer peril and a customer anomaly; and, in response to said examination, choosing a relevant insurance policy at an appropriate price.

13. The method recited in claim 1 wherein a customer of said financial entity suffers an effect covered by an insurance policy issued by said financial entity; and,
said method further comprising:
examining an internetwork connection for said customer to determine whether said internetwork included an anomaly that produced said effect.

14. The method recited in claim 1 wherein said financial entity is tracking a current state of said internetwork; and,
said method further comprising:
periodically correlating said input information;
periodically translating said periodically correlated input information; and,
providing at least one update regarding said at least one operational risk to said financial entity.

15. The method recited in claim 1 wherein said internetwork comprises a future anomaly and a current anomaly; and,
said method further comprising:
predicting said future anomaly and a progress of said current anomaly.

16. The method recited in claim 1 wherein said internetwork comprises a peril; and,
said method further comprising:
visualizing said peril, said at least one anomaly, and said at least one operational risk in a chart, graph, map, or moving picture.

17. The method recited in claim 1 wherein translating said at least one anomaly into at least one operational risk for said financial entity further comprises generating a function or table selected from the group consisting of an IPET, an IPAR, an IPOR, an IPTR, an IPSR, an IPSC, and an IPIRPM.

18. A method for determining financial loss related to performance of the Internet, comprising:
collecting, detecting, and characterizing input information regarding performance of an internetwork;
detecting at least one anomaly in at least one portion of said internetwork;
translating said at least one anomaly into at least one operational risk for a financial entity that underwrites insurance premiums and bonds;
determining a spread in time and space of effects of at least one anomaly and said at least one peril in the Internet on the at least one subset of the Internet;
collating said plurality of known anomalies according to type and for each said type, computing a probability of occurrence, duration, and effects;
estimating probabilities of degradation or interruption of connectivity to a subset of nodes;
adding information regarding a transaction to compute transaction risk for a subset using a transaction a number of times;
estimating a cost to a subset of the Internet for at least one operational risk; and,
for an enterprise in an industry, estimating a number of policies to sell and a price at which to sell said number of policies to cover claims associated with said enterprise and provide a level of profit for said financial entity.

19. A computer-based system for determining financial loss related to performance of an internetwork, comprising:
means to collect input information regarding performance of an internetwork using techniques that simultaneously record topology and performance;
means to detect at least one anomaly in at least one portion of said internetwork;

means to translate said at least one anomaly into at least one operational risk for a financial entity that underwrites insurance premiums, including:
  means to add information about a first plurality of enterprises in an industry;
  means to estimate a total cost for said industry for said plurality of anomalies; and,
  means to determine respective costs for claims on insurance policies for said industry based on said total costs; or,
  means to interrogate at least a portion of the network topology;
  means to make estimates of internetwork conditions at the time of an anomaly resulting in a loss; and,
  means to calibrate a disbursement against a covered party's claims with respect to the at least one anomaly.

20. The system recited in claim 19 wherein said internetwork is the Internet.

21. The system recited in claim 19 wherein said internetwork comprises at least one anomaly; and,
said system further comprising:
  means to characterize said at least one anomaly by type, severity, duration, and effect.

22. The system recited in claim 19 wherein said internetwork comprises at least one subset and at least one peril; and,
  said system further comprising: means to determine a spread in time and space of effects of said at least one anomaly and said at least one peril on the internetwork and on the at least one subset.

23. The system recited in claim 19 further comprising:
means to gather secondary external information, where said secondary external information is other than directly from said internetwork;
means to correlate said input and secondary external information; and,
means to translate said correlated input and secondary external information into a second at least one operational risk for said financial entity.

* * * * *